US008917430B2

(12) United States Patent
Nishiura

(10) Patent No.: US 8,917,430 B2
(45) Date of Patent: Dec. 23, 2014

(54) IMAGE PROCESSING APPARATUS AND IMAGE FORMING APPARATUS

(71) Applicant: KYOCERA Document Solutions Inc.

(72) Inventor: Mitsuko Nishiura, Osaka (JP)

(73) Assignee: KYOCERA Document Solutions, Inc. (JP)

( * ) Notice: Subject to any disclaimer, the term of this patent is extended or adjusted under 35 U.S.C. 154(b) by 0 days.

(21) Appl. No.: 14/161,854

(22) Filed: Jan. 23, 2014

(65) Prior Publication Data
US 2014/0240726 A1 Aug. 28, 2014

(30) Foreign Application Priority Data

Feb. 26, 2013 (JP) ................................. 2013-036480

(51) Int. Cl.
*G03F 3/08* (2006.01)
*G06K 15/02* (2006.01)
(52) U.S. Cl.
CPC ................................. *G06K 15/1878* (2013.01)
USPC ............................. 358/520; 358/1.9; 358/518
(58) Field of Classification Search
USPC .......................................... 358/1.9, 515–522
See application file for complete search history.

(56) References Cited

U.S. PATENT DOCUMENTS

| 7,765,480 | B2 * | 7/2010 | Hasegawa et al. | 715/730 |
| 7,859,545 | B2 * | 12/2010 | Tokunaga | 345/581 |
| 8,014,599 | B2 * | 9/2011 | Ohga et al. | 382/167 |
| 8,049,765 | B2 * | 11/2011 | Ahn et al. | 345/589 |
| 8,823,726 | B2 * | 9/2014 | Pettigrew et al. | 345/589 |
| 2014/0211223 | A1 * | 7/2014 | Nishiura | 358/1.9 |
| 2014/0240340 | A1 * | 8/2014 | Shirasawa | 345/590 |

FOREIGN PATENT DOCUMENTS

| JP | 2006-345094 | 12/2006 |
| JP | 2008-009649 | 1/2008 |
| JP | 2008-139457 | 6/2008 |

* cited by examiner

*Primary Examiner* — Dung Tran

(57) ABSTRACT

In the image processing apparatus, a display control unit displays property control units that specify correction strength independently for chroma, brightness and hue angle in selectable ranges in accordance with the user operation. Allowed correction ranges for chroma, brightness and hue angle based on a color difference formula are set to the selectable ranges. If correction strength specified by one of the property control units is changed according to the user operation, then an allowed correction range determining unit determines and changes the allowed correction ranges of residual properties using the color difference formula to which the changed correction strength of one property among chroma, brightness and hue angle has been applied, and the display control unit changes the selectable ranges of the property control units of the residual properties to the changed allowed correction ranges, and changes indication of the property control units of the residual properties.

10 Claims, 10 Drawing Sheets

FIG. 2

$$\Delta E'_{00} = \sqrt{\left(\frac{\Delta L'}{S_L}\right)^2 + \left(\frac{\Delta C'}{S_C}\right)^2 + \left(\frac{\Delta H'}{S_H}\right)^2}$$

$$S_L = 1 + \frac{0.015(L'_{av} - L_{paper})^2}{\sqrt{20 + (L'_{av} - L_{paper})^2}}$$

$$\Delta E^*_{ab} = \sqrt{\Delta L'^2 + \Delta C'^2 + \Delta H'^2}$$

IMAGE PROCESSING APPARATUS AND IMAGE FORMING APPARATUS

CROSS-REFERENCE TO RELATED APPLICATIONS

This application relates to and claims priority rights from Japanese Patent Application No. 2013-036480, filed on Feb. 26, 2013, the entire disclosures of which are hereby incorporated by reference herein.

BACKGROUND

1. Field of the Present Disclosure

The present disclosure relates to an image processing apparatus and an image forming apparatus.

2. Description of the Related Art

In an image processing apparatus, a user can edit an image by operating slide bars of chroma, brightness and hue. The image processing apparatus (a) searches for maximum values and minimum values in allowed ranges of chroma, brightness and hue in which a color difference value of the CIE1994 color difference formula is either equal to or less than a user specified value Eth by repeatedly adding a single constant to chroma, brightness and hue of a reference color, and (b) applies the maximum values and the minimum values to respective maximum values and respective minimum values in slide bars of the properties: chroma, brightness and hue.

Further, for two contrary image processes, in accordance with one input operation, another image processing apparatus is capable of both strengthening one of the image processes and weakening the other.

However, the aforementioned image processing apparatus uses one single constant to uniformly search for the allowed ranges of chroma, brightness, and hue, and therefore, the apparatus may find a narrow range as the allowed range of chroma, brightness or hue.

For example, even if a user does not feel to change a chroma value and changes at least one of a brightness value and a hue value so as to exceed the allowed range specified in the aforementioned image processing apparatus, the aforementioned color difference value may not exceed the user specified value Eth. Thus, in this case, at least one of the allowed ranges of brightness and hue may be set as an improper narrow range.

SUMMARY

An image processing apparatus according to an aspect of the present disclosure, includes a display control unit, an input detecting unit, and an allowed correction range determining unit. The display control unit is configured to display a color adjustment screen of an image on a predetermined display device. The input detecting unit is configured to detect a user operation to the color adjustment screen with a predetermined input device. The allowed correction range determining unit is configured to determine allowed ranges of correction strength for chroma, brightness and hue angle to correct a color in the image. The input detecting unit is further configured to detect a value specified by the user operation as an uppermost value of a predetermined color difference formula for colors before and after correction. The allowed correction range determining unit is further configured to determine, as the allowed ranges, ranges of chroma, brightness and hue angle in which a value of the predetermined color difference formula for colors before and after correction at the correction strength is either equal to or less than the uppermost value. The display control unit is further configured to display indication of property control units in the color adjustment screen, and the property control units are capable of specifying the correction strength independently for chroma, brightness and hue angle in selectable ranges in accordance with the user operation. The allowed ranges are set to the selectable ranges of the property control units for chroma, brightness and hue angle. The allowed correction range determining unit is further configured to, if the correction strength specified by one of the property control units is changed according to the user operation for chroma, brightness or hue angle, determine and change the allowed ranges of residual properties using the predetermined color difference formula to which the changed correction strength of one property among chroma, brightness and hue angle has been applied, and the display control unit is further configured to change the selectable ranges of the property control units of the residual properties to the changed allowed ranges and change indication of the property control units of the residual properties.

An image forming apparatus according to an aspect of the present disclosure includes the aforementioned image processing apparatus.

These and other objects, features and advantages of the present disclosure will become more apparent upon reading of the following detailed description along with the accompanied drawings.

BRIEF DESCRIPTION OF THE DRAWINGS

FIG. 2 shows a color difference formula used in the image processing apparatus shown in FIG. 1;

FIG. 4 shows a commonly used color difference formula;

DETAILED DESCRIPTION

Hereinafter, an embodiment according to an aspect of the present disclosure will be explained with reference to drawings.

Figure 1:
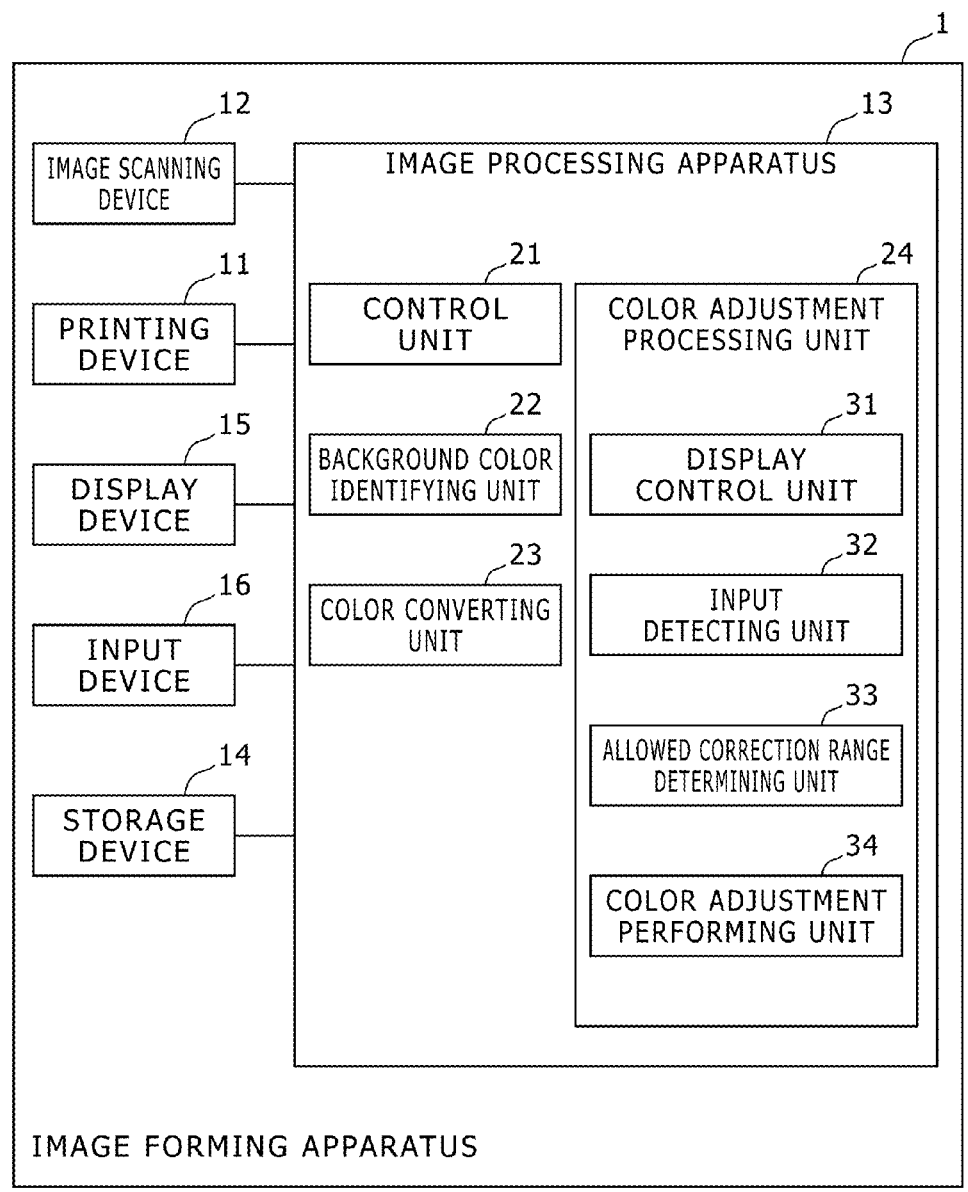
FIG. 1 shows a block diagram which indicates a configuration of an image forming apparatus according to an embodiment of the present disclosure.

FIG. 1 shows a block diagram which indicates a configuration of an image forming apparatus according to an embodiment of the present disclosure. The image forming apparatus 1 shown in FIG. 1 is a copier, but may be a multi function peripheral or the like.

The image forming apparatus 1 includes a printing device 11, an image scanning device 12, an image processing apparatus 13, a storage device 14, a display device 15, and an input device 16.

The printing device 11 is an instance of an outputting device and internal device that prints a document image based on image data after sorts of image processing by the image processing apparatus 13 in an electro photographic process using toner of CMYK (Cyan, Magenta, Yellow, and Black) colors.

Further, the image scanning device 12 is an internal device that optically scans a document image of a document and generates image data of the document image as RGB data.

Furthermore, the image processing apparatus 13 performs image processing such as color adjustment, color conversion and so forth for image data such as the image data generated by the image scanning device 12.

Furthermore, the storage device 14 is a non volatile rewritable storage device such as a flash memory and stores sorts of data. The display device 15 displays sorts of screens to a user such as a color adjustment screen for adjustment of a color in an image. The input device 16 detects a user operation. For example, the display device 15 and the input device 16 are arranged in an operation panel of the image forming apparatus 1, the display device 15 includes a liquid crystal display, and the input device 16 includes a touch panel and hard keys.

The image processing apparatus 13 includes a control unit 21, a background color identifying unit 22, a color converting unit 23, and a color adjustment processing unit 24, which are formed with an ASIC (Application Specific Integrated Circuit) and/or a microcomputer.

The control unit 21 controls and causes the printing device 11 and the image scanning device 12 to perform acquiring image data of a document and printing a document image.

The background color identifying unit 22 identifies a background color in an image. Specifically, a color of a background of an object (i.e. a color of a paper sheet of the document) in image data is regarded as a background color, and a color value of the background color (here the brightness Lpaper) is identified.

The color converting unit 23 calculates second color values (here CYMK values) in a color space of the printing device 11 on the basis of first color values (here RGB values) in an original color space of an objective color of the color conversion using a color difference formula that evaluates a color difference between two sets of color values in a coordinate system of plural properties (here brightness, chroma, and hue angle).

FIG. 2 shows a color difference formula used in the image processing apparatus 13 shown in FIG. 1. This color difference formula is derived by improving the CIEDE2000 color difference formula on the basis of a subjective evaluation.

The subjective evaluation was performed using a fluorescent lamp for color evaluation as a light source in a dark room. A PPC (Plain Paper Copier) paper sheet (ISO Brightness 84 percent) was used as a background. A color chip has a size of 20 millimeters in width and height, and plural color chips are formed of different values with a constant interval in one of brightness, chroma, and hue angle. The plural color chips were horizontally arranged and shown with an interval of 5 millimeters. Using these color chips, a range (i.e. limit values) of a color that a person allows as a reference color (i.e. a color allowed as a reference color outputted by an outputting device) is evaluated. This evaluation is performed by plural persons and each person performs it plural times.

In this color difference formula, delta L' is a brightness difference between color values in the first color space and color values in the second color space, delta C' is a chroma difference between color values in the first color space and color values in the second color space, and delta H' is a hue angle difference between color values in the first color space and color values in the second color space.

Further, L'av is a brightness average value of color values in the first color space and color values in the second color space; and C'av is a chroma average value of color values in the first color space and color values in the second color space.

Further, Lpaper is a brightness of the background color identified by the background color identifying unit 22.

Thus, the color difference formula used in this embodiment is a formula that uses a color value of the background color as a parameter and derives the color difference on the basis of a chroma difference, a brightness difference, and a hue angle difference between color values in the first color space and color values in the second color space. Specifically, this color difference formula is a formula that derives the color difference using the product of the brightness difference and a coefficient based on a brightness value of the background color.

Figure 3A:
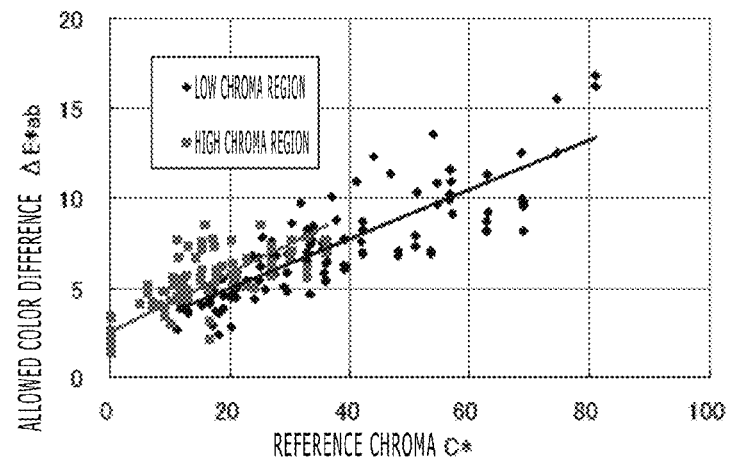
FIGS. 3A to 3C show diagrams which indicates an example of a result of a subjective evaluation on the color difference formula shown in FIG. 2.
Figure 3B:
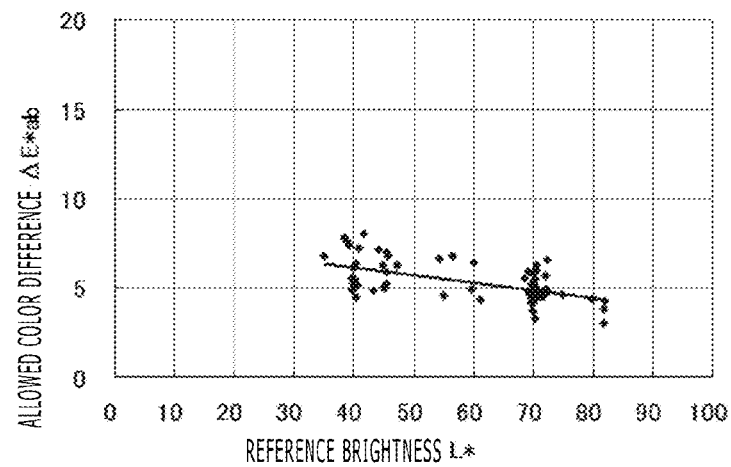
Figure 3C:
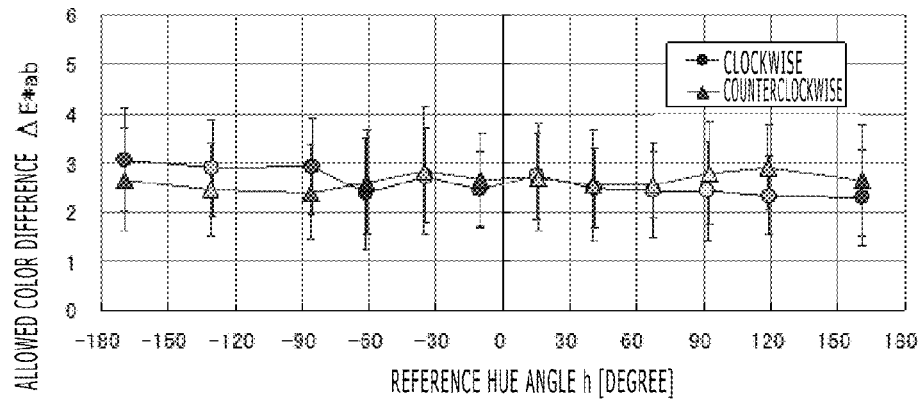
Figure 4:
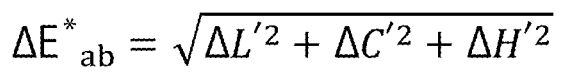

FIGS. 3A to 3C show diagrams which indicates an example of a result of a subjective evaluation on the color difference formula shown in FIG. 2. FIG. 3A shows a diagram that explains allowed color difference of chroma. FIG. 3B shows a diagram that explains allowed color difference of brightness. FIG. 3C shows a diagram that explains allowed color difference of hue angle. In the subjective evaluation, an allowed color difference range is evaluated for each property value of each property among chroma, brightness and hue angle. In this subjective evaluation, limit values of the allowed color difference are determined for each property value of chroma, brightness and hue angle on the basis of a color difference formula shown in FIG. 4. The color difference formula shown in FIG. 2 is a formula obtained by improving the CIEDE2000 color difference formula on the basis of the allowed color differences of the properties. It should be noted that the color difference formula shown in FIG. 4 is used for the subjective evaluation, and is not used by the color converting unit 23.

Returning FIG. 1, the color adjustment processing unit 24 uses the display device 15 and the input device 16 as a user interface, and performs a color adjustment of an image interactively with a user.

The color adjustment processing unit 24 includes a display control unit 31, an input detecting unit 32, an allowed correction range determining unit 33, and a color adjustment performing unit 34.

The display control unit 31 displays a color adjustment screen on the display device 15 for an image, for example, based on the image data generated by the image scanning device 12.

The display control unit 31 displays indication of property control units in the color adjustment screen. The property control units are capable of specifying correction strength independently for chroma, brightness and hue angle within selectable ranges in accordance with the user operation. The allowed correction ranges determined by the allowed correction range determining unit 33 are set to the selectable ranges of the property control units for chroma, brightness and hue angle.

For example, the correction strength is a value of a coefficient multiplied to a value of each property or a value of a parameter in a function used for color correction of each property.

Further, the display control unit 31 displays an objective image of color adjustment on the display device 15. If the correction strength specified by one of the property control units is changed according to the user operation for chroma, brightness or hue angle, then the display control unit 31 changes the displayed image to the image corrected on the basis of (a) the changed correction strength for one property of which the correction strength is changed and (b) the current correction strength for residual properties among chroma, brightness and hue angle.

Furthermore, the display control unit 31 displays an objective color specified by a user operation in the objective image, and displays color charts along the property control units and changes the color charts in accordance with change of the selectable ranges of the property control units. The color charts indicate color distributions obtained by correcting the objective color along the selectable ranges of the property control units.

Furthermore, the display control unit 31 displays a color difference uppermost value control unit in the color adjustment screen. The color difference uppermost value control unit is capable of specifying the uppermost value of the predetermined color difference formula in a selectable range in accordance with the user operation.

The input detecting unit 32 detects sorts of user operations to the color adjustment screen with the input device 16. As an uppermost value of the predetermined color difference formula for colors before and after color correction, the input detecting unit 32 detects a value specified by a user operation to the color difference uppermost value control unit. Further, as the objective color, the input detecting unit 32 detects a color specified by a user operation in an image displayed on the display device 15. Furthermore, the input detecting unit 32 detects a user operation to the aforementioned property control units.

Figure 5:
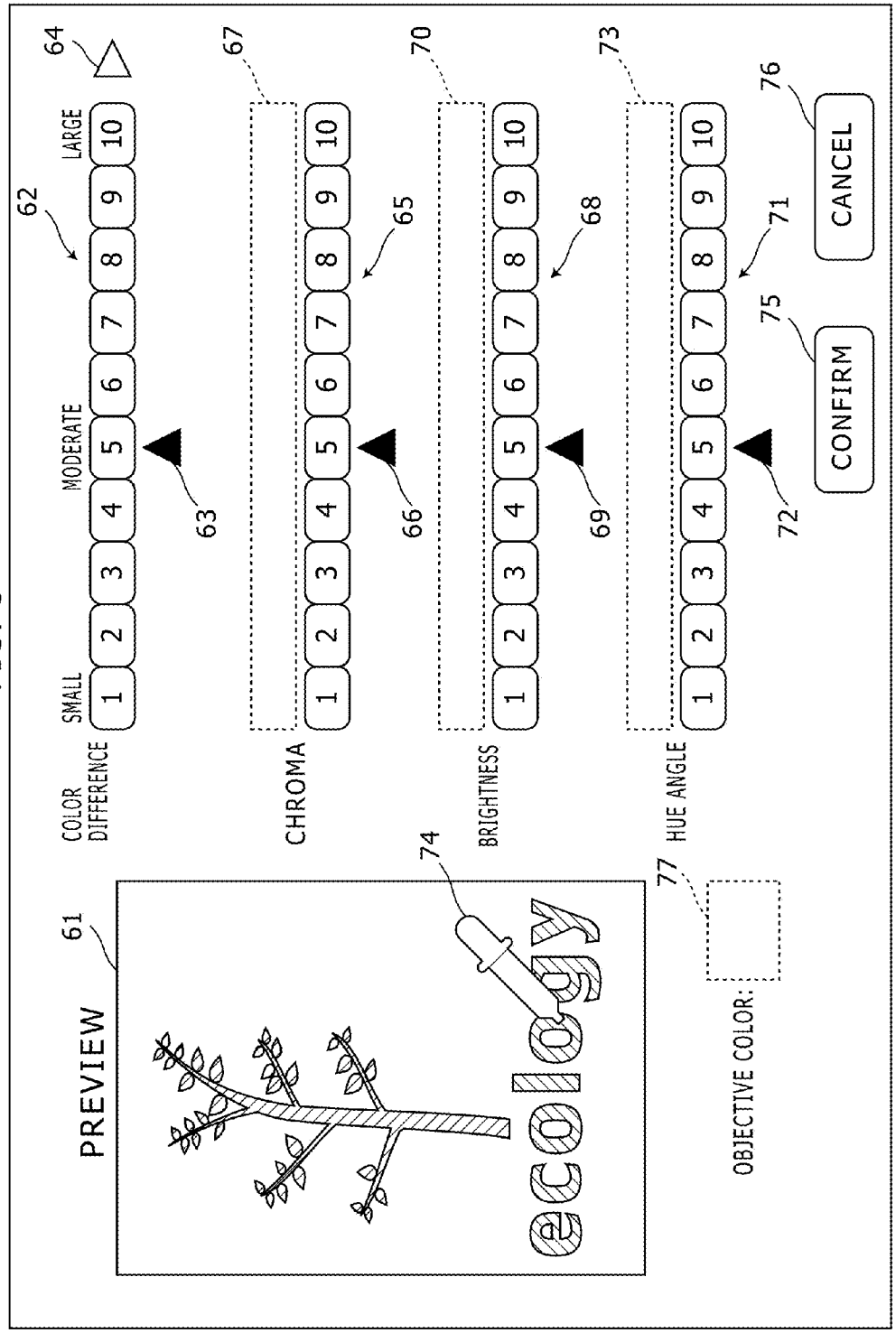
FIG. 5 shows a diagram which indicates an example of a color adjustment screen displayed on a display device by the image processing apparatus shown in FIG. 1.

FIG. 5 shows a diagram which indicates an example of a color adjustment screen displayed on the display device 15 by the image processing apparatus 13 shown in FIG. 1.

In the color adjustment screen shown in FIG. 5, an objective image (color image) 61 is displayed.

Further, in the color adjustment screen shown in FIG. 5, a color difference uppermost value control unit 62 is displayed. The color difference uppermost value control unit 62 is a slide bar, and includes an inline color difference value array and a slider 63 that selects one value in the color difference value array. A position of the slider 63 is enabled to move along the color difference value array according to a user operation to the input device 16. In the status shown in FIG. 5, the color difference value of 5 is selected.

Further, an uppermost value enlarging control unit 64 is displayed adjacent to an end in the uppermost value side of the color difference value array in the color difference uppermost value control unit 62. The uppermost value enlarging control unit 64 is a control unit to enlarge the selectable range of the color difference uppermost value control unit 62 in accordance with a user operation. For example, the uppermost value enlarging control unit 64 is a soft key that can be pressed down by a user operation. The display control unit 31 enlarges the selectable range of the color difference uppermost value control unit 62 and changes indication of the color difference uppermost value control unit 62 in accordance with a user operation to the uppermost value enlarging control unit 64. For example, every time when the uppermost value enlarging control unit 64 is pressed down, the selectable range is enlarged by a predetermined value (e.g. 1).

Figure 6:
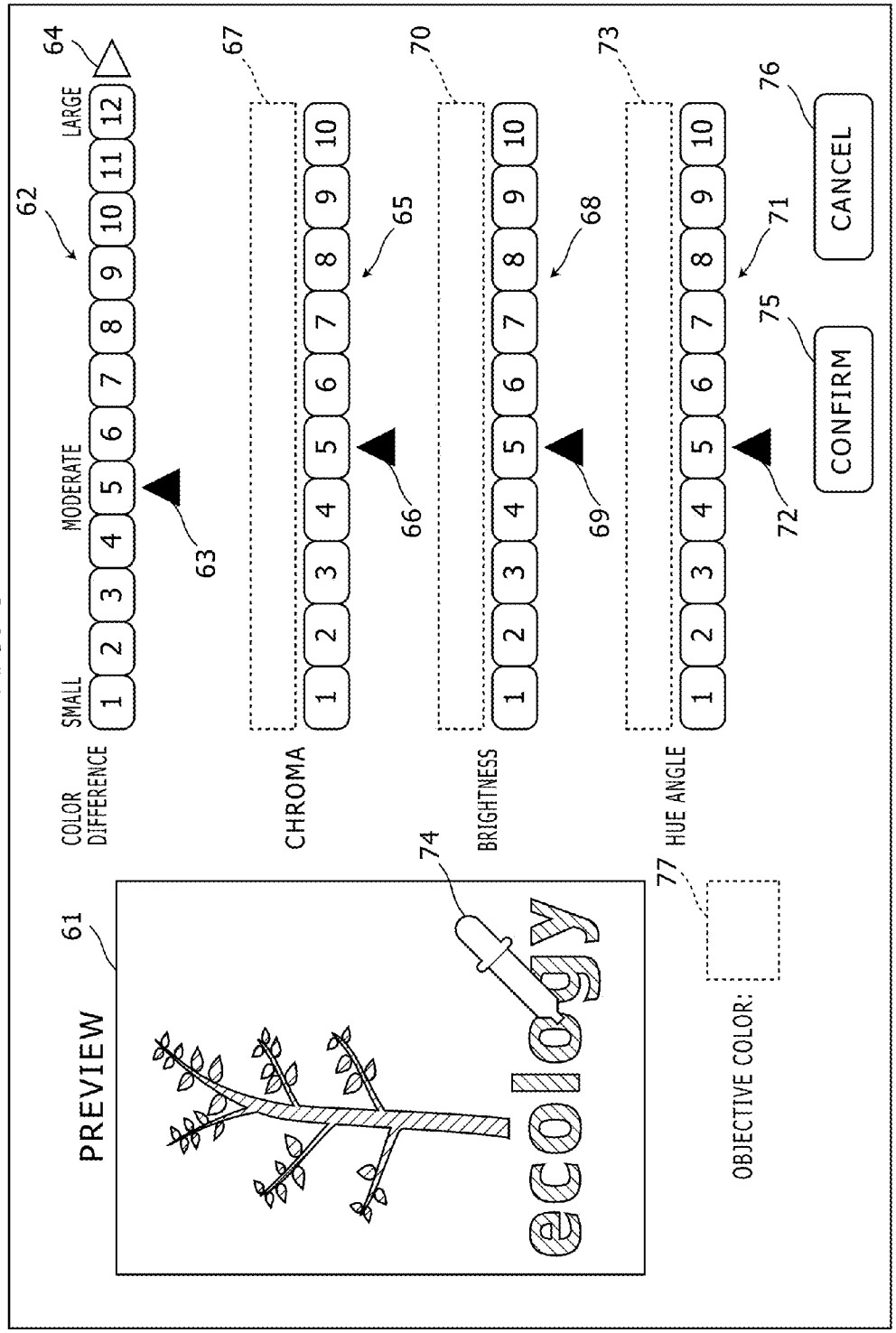
FIG. 6 shows a diagram which indicates an example of a status after enhancing an uppermost value of a color difference in the color adjustment screen shown in FIG. 5.

FIG. 6 shows a diagram which indicates an example of a status after enhancing an uppermost value of a color difference in the color adjustment screen shown in FIG. 5. For example, if the uppermost value enlarging control unit 64 is pressed down twice in the status shown in FIG. 5, then the uppermost value of the selectable range of the color difference uppermost value control unit 62 is changed from 10 to 12 and the selectable range is enlarged as shown in FIG. 6.

Returning to FIG. 5, in the color adjustment screen shown in FIG. 5, a property control unit 65 of chroma is displayed. The property control unit 65 of chroma is a slide bar, and includes an inline correction strength level value array of chroma and a slider 66 that selects one level value in the correction strength level value array. A position of the slider 66 is enabled to move along the correction strength level value array according to a user operation to the input device 16. In the status shown in FIG. 5, the level value of 5 (default value) is selected.

Each level value is assigned to actual correction strength, and correction strength is selected corresponding to a level value indicated by the slider 66. In FIG. 5, the correction strength level value array includes values from 1 to 10 with the interval of 1, the level value of 5 corresponds to the correction strength of zero, the level values less than 5 indicates negative correction strength, the level values larger than 5 indicates positive correction strength, and a level value farther from 5 results in a larger absolute value of the correction strength.

Further, in an area 67 along the property control unit 65, a color chart mentioned below is displayed, if an objective color is selected as mentioned below.

Further, in the color adjustment screen shown in FIG. 5, a property control unit 68 of brightness is displayed. The property control unit 68 of brightness is a slide bar, and includes an inline correction strength level value array of brightness and a slider 69 that selects one level value in the correction strength level value array. A position of the slider 69 is enabled to move along the correction strength level value array according to a user operation to the input device 16. In the status shown in FIG. 5, the level value of 5 (default value) is selected.

Each level value is assigned to actual correction strength, and correction strength is selected corresponding to a level value indicated by the slider 69. In FIG. 5, the correction strength level value array includes values from 1 to 10 with the interval of 1, the level value of 5 corresponds to the correction strength of zero, the level values less than 5 indicates negative correction strength, the level values larger than 5 indicates positive correction strength, and a level value farther from 5 results in a larger absolute value of the correction strength.

Further, in an area 70 along the property control unit 68, a color chart mentioned below is displayed, if an objective color is selected as mentioned below.

Further, in the color adjustment screen shown in FIG. 5, a property control unit 71 of hue angle is displayed. The property control unit 71 of hue angle is a slide bar, and includes an inline correction strength level value array of hue angle and a slider 72 that selects one level value in the correction strength level value array. A position of the slider 72 is enabled to move along the correction strength level value array according to a user operation to the input device 16. In the status shown in FIG. 5, the level value of 5 (default value) is selected.

Each level value is assigned to actual correction strength, and correction strength is selected corresponding to a level value indicated by the slider 72. In FIG. 5, the correction strength level value array includes values from 1 to 10 with the interval of 1, the level value of 5 corresponds to the correction strength of zero, the level values less than 5 indicates negative correction strength, the level values larger than 5 indicates positive correction strength, and a level value farther from 5 results in a larger absolute value of the correction strength.

Further, in an area 73 along the property control unit 71, a color chart mentioned below is displayed, if an objective color is selected as mentioned below.

Figure 7:
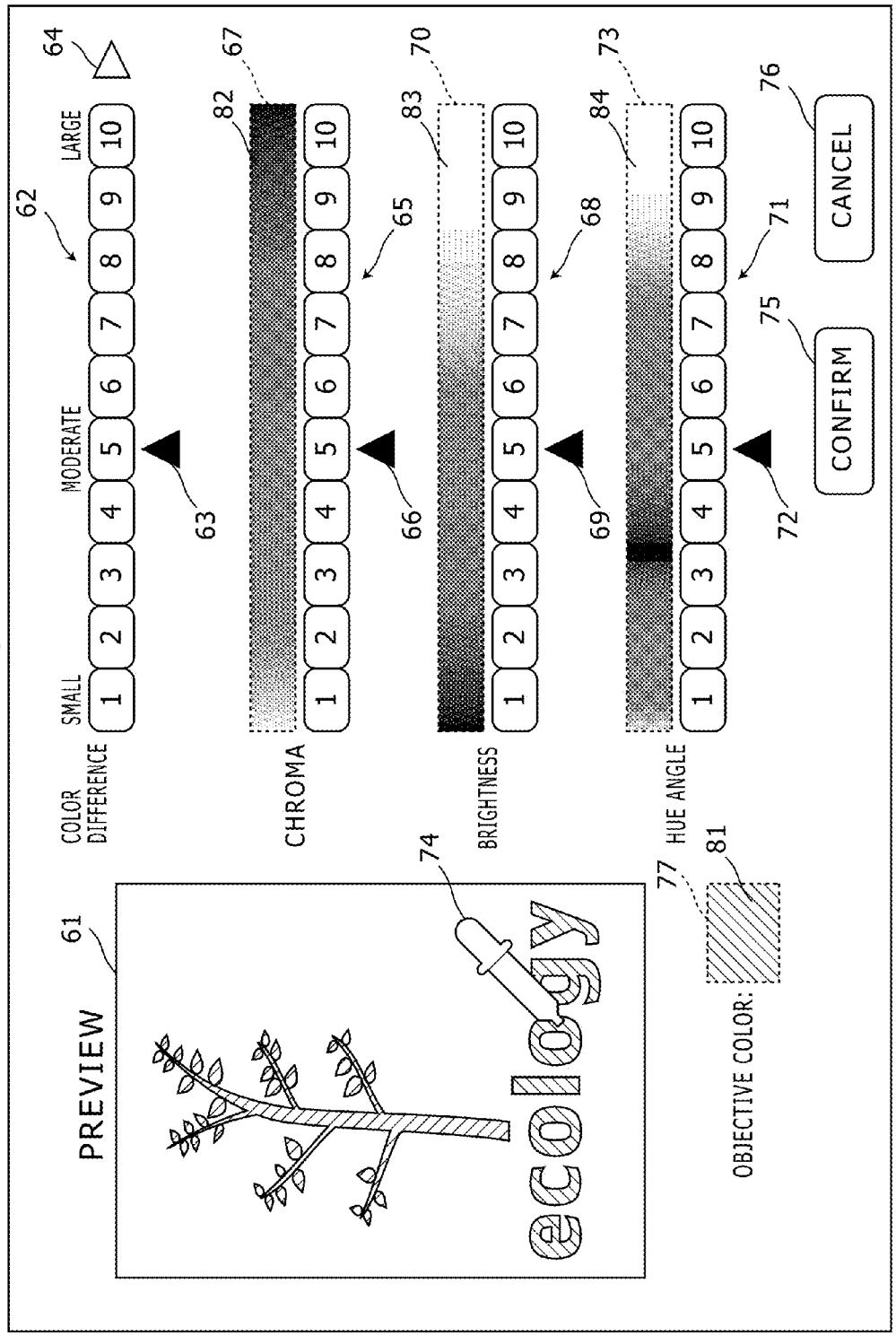
FIG. 7 shows a diagram which indicates an example of a status after selecting an objective color in the color adjustment screen shown in FIG. 5.

Furthermore, in the color adjustment screen shown in FIG. 5, a spuit tool 74 is displayed. The spuit tool 74 is an image used to extract a color at a tip of the spuit tool 74 as an objective color in an image 61. A position where the spuit tool 74 is displayed is enabled to move according to a user operation. A color specified by the spuit tool 74 is displayed as a color patch 81 in an area 77. FIG. 7 shows a diagram which indicates an example of a status after selecting an objective color in the color adjustment screen shown in FIG. 5. When an objective color is specified using the spuit tool 74, as shown in FIG. 7, the aforementioned color charts 82, 83 and 84 are displayed in the areas 67, 70 and 73.

Further, in the color adjustment screen shown in FIG. 5, a confirm button 75 and a cancel button 76 are displayed. The confirm button 75 is to confirm the correction strength and perform color correction at this correction strength. The cancel button 76 is to terminate color adjustment of the color adjustment screen.

Returning to FIG. 1, the allowed correction range determining unit 33 determines allowed ranges (also referred as allowed correction ranges) of correction strength for chroma, brightness and hue angle to correct a color in the image.

The allowed correction range determining unit 33 determines, as the allowed ranges, ranges of chroma, brightness and hue angle in which a value of the predetermined color difference formula for colors before and after correction at the aforementioned correction strength is either equal to or less than the uppermost value.

Specifically, the allowed correction range determining unit 33 determines, as the allowed ranges, ranges of chroma, brightness and hue angle in which a value of the predetermined color difference formula for (a) the aforementioned objective color and (b) a color obtained by correcting the objective color with the correction strength of chroma, brightness and hue angle is either equal to or less than the uppermost value.

The color difference formula used in the allowed correction range determining unit 33 is the CIEDE2000 color difference formula or the aforementioned color difference formula shown in FIG. 2 (i.e. a formula that derives a color difference from a chroma difference, a brightness difference and a hue angle difference with a color value of the background color as a parameter). These color difference formulas is designed so as not to largely change visual impression between two colors (before and after color correction) when the color difference value does not largely change even if a chroma difference, a brightness difference and a hue angle difference are changed.

If the correction strength specified by one of the property control units is changed according to the user operation for chroma, brightness or hue angle, then the allowed correction range determining unit 33 determines and changes the allowed correction ranges of residual properties using the predetermined color difference formula to which the changed correction strength of one property among chroma, brightness and hue angle has been applied. Due to this change, the display control unit 31 changes the selectable ranges of the property control units of the residual properties to the changed allowed correction ranges, and changes indication of the property control units of the residual properties.

Furthermore, if the uppermost value specified by the color difference uppermost value control unit is changed according to the user operation, then the allowed correction range determining unit 33 determines and changes the allowed correction ranges for chroma, brightness and hue angle. Due to this change, the display control unit 31 changes the selectable ranges of the property control units to the changed allowed correction ranges, and changes indication of the property control units of the residual properties.

If a predetermined user operation is detected, the color adjustment performing unit 34 performs color correction for the objective image with the current correction strength of chroma, brightness and hue angle.

Figure 8:
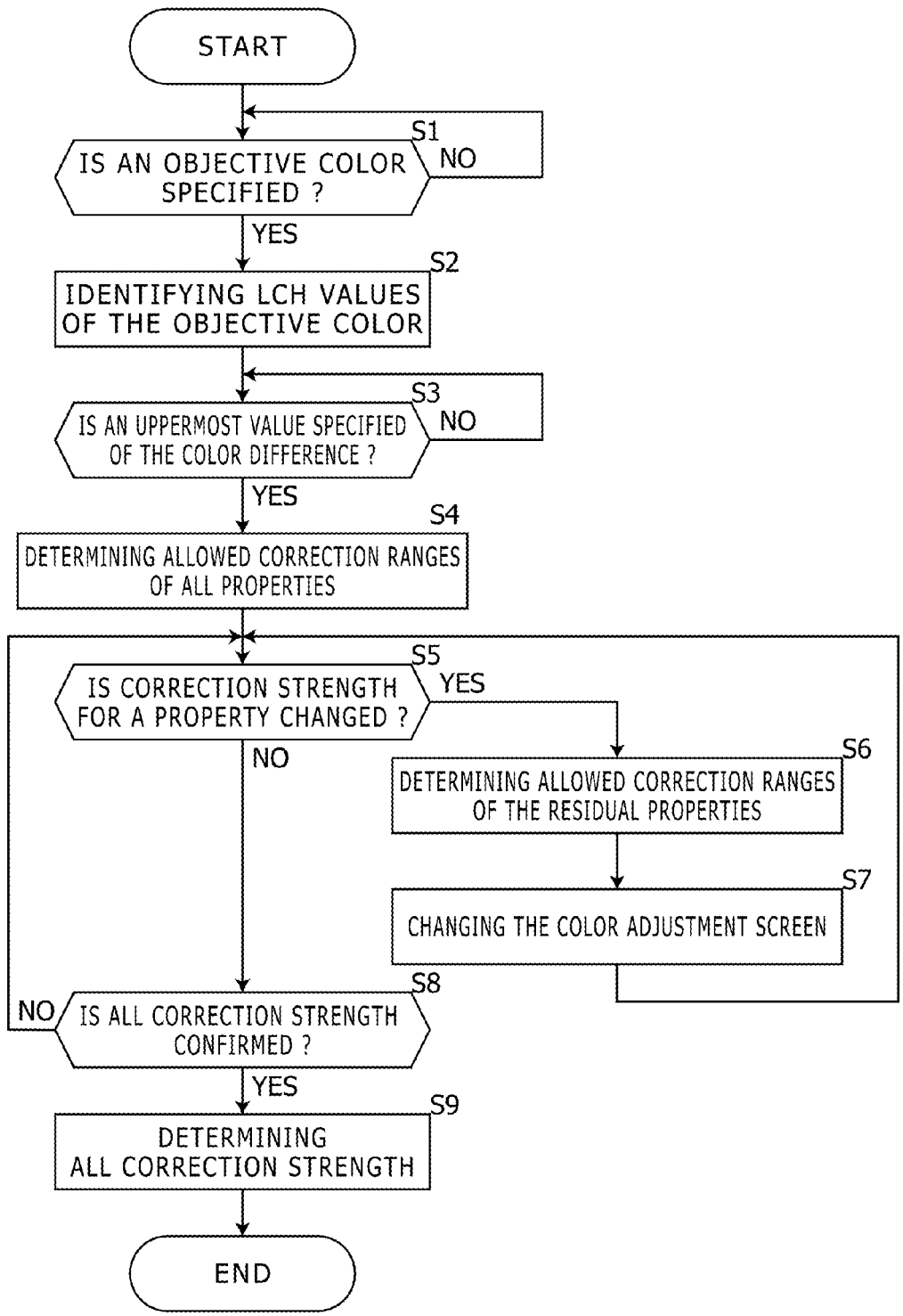
FIG. 8 shows a flowchart which explains a behavior of the image processing apparatus shown in FIG. 1.

In the following part, a behavior of the aforementioned image processing apparatus 13 (mainly, a behavior of the color adjustment processing unit 24) is explained. FIG. 8 shows a flowchart which explains a behavior of the image processing apparatus 13 shown in FIG. 1.

When a predetermined user operation is detected with the input device 16, a color adjustment process is started. In the color adjustment process, at first, the display control unit 31 displays a color adjustment screen, for example, shown in FIG. 5 on the display device 15.

A user moves the spuit tool 74 to a desired position in the image 61 and specifies a color at the position as an objective color.

If the input detecting unit 32 detects this user operation (Step S1), then the display control unit 31 identifies the specified color, and displays a color patch 81 of this color in an area 77. The allowed correction range determining unit 33 converts color values (e.g. RGB values) of this objective color to LCH values (Step S2).

Further, the user operates the slider 63 and specifies an uppermost value of the color difference.

If the input detecting unit 32 detects this user operation (Step S3), then the allowed correction range determining unit 33 determines, as allowed correction ranges, ranges of chroma, brightness and hue angle in which a value of the predetermined color difference formula for the objective color (the LCH values) and a color obtained by correcting the objective color with respective correction strength of chroma, brightness and hue angle is either equal to or less than the uppermost value (Step S4). For respective properties, these allowed correction ranges are set to selectable ranges of the property control units 65, 68 and 71.

When the selectable ranges are set for chroma, brightness and hue angle, for example, as shown in FIG. 7, the display control unit 31 displays color charts 82, 83 and 84 for chroma, brightness and hue angle, respectively, in the color adjustment screen.

Subsequently, the user changes and specifies correction strength of one among chroma, brightness and hue angle using the property control unit 65, 68 or 71 of one among chroma, brightness and hue angle.

If the input detecting unit 32 detects this user operation (Step S5), then the allowed correction range determining unit 33 determines and changes the allowed correction ranges of residual properties using the predetermined color difference formula to which the changed correction strength of one property among chroma, brightness and hue angle has been applied (i.e. using the predetermined color difference formula in which the changed correction strength of this property is used) (Step S6).

Due to this change, the display control unit 31 changes the selectable ranges of the property control units of the residual properties to the changed allowed correction ranges, and changes indication of the property control units of the residual properties (Step S7). In addition, in each one of the property control units, two level values are identified corresponding to the uppermost value and the lowermost value of the changed allowed correction range, and the level value array to be displayed is limited to a range from one of the identified level values to the other.

Further, the display control unit 31 changes the image 61 to an image obtained by correcting the image 61 with the correction strength corresponding to the currently specified level values. Consequently, the image corrected with the currently specified correction strength for the respective properties is previewed.

Figure 9:
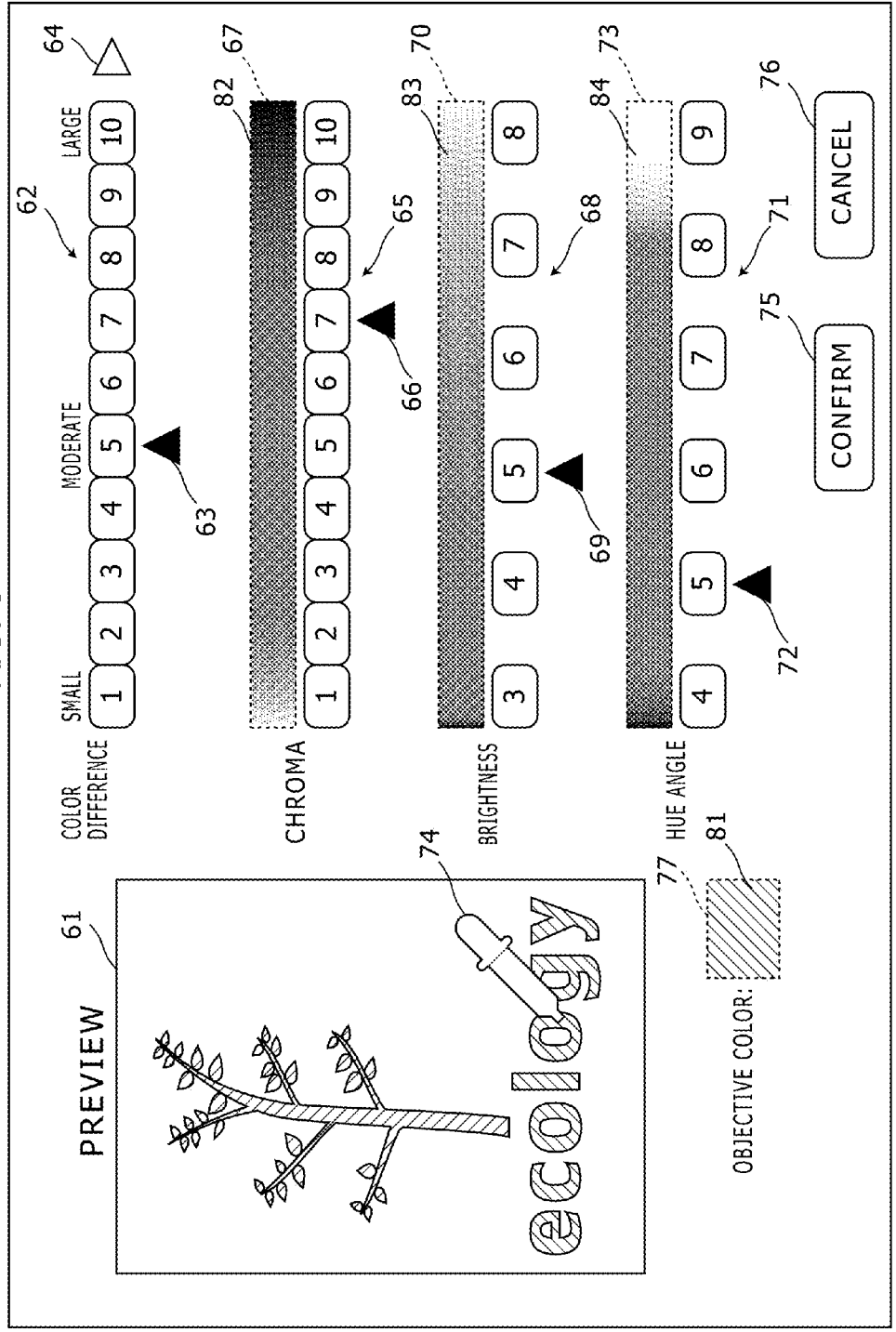
FIG. 9 shows a diagram which indicates an example of a status after adjusting a correction strength of chroma in the color adjustment screen shown in FIG. 7.

FIG. 9 shows a diagram which indicates an example of a status after adjusting a correction strength of chroma in the color adjustment screen shown in FIG. 7. For example, as shown in FIG. 9, if the level value of 7 is selected for correction strength of chroma, then the level value array of the property control unit 68 is limited to a range from 3 to 8 for correction strength of brightness, and the level value array of the property control unit 71 is limited to a range from 4 to 9 for correction strength of hue angle. It should be noted that the lengths of the property control units 68 and 71 are not changed in the example shown in FIG. 9.

Figure 10:
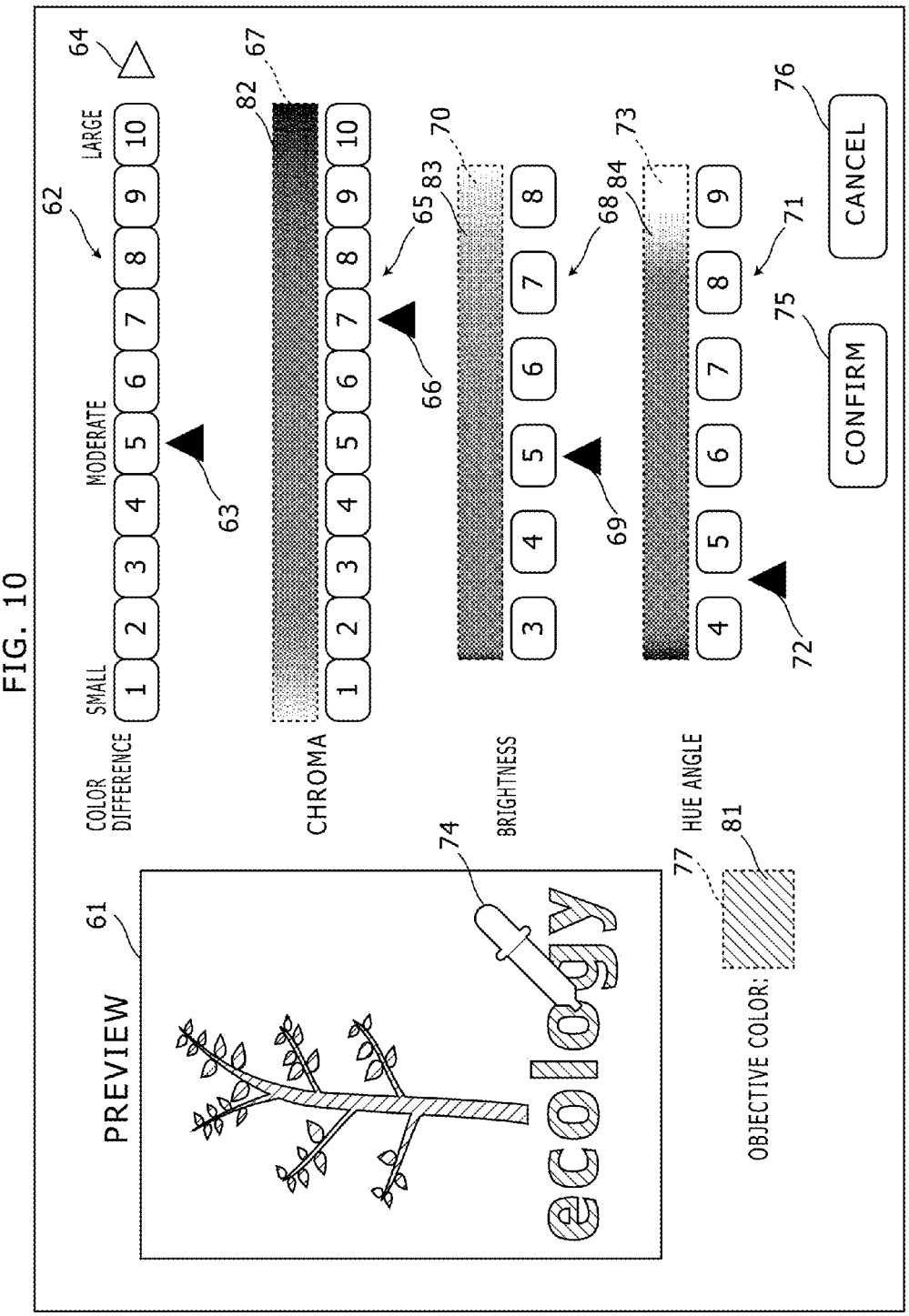
FIG. 10 shows a diagram which indicates another example of a status after adjusting a correction strength of chroma in the color adjustment screen shown in FIG. 7.

In this case, as shown in FIG. 10, the lengths of the property control units 68 and 71 may be changed in accordance with a difference between the uppermost value and the lowermost value among the level values. FIG. 10 shows a diagram which indicates another example of a status after adjusting a correction strength of chroma in the color adjustment screen shown in FIG. 7.

In the status shown in FIG. 9, for example, if the level value for brightness is changed from 5 to 6, then indication of the property control unit 68 and the color chart 83 for brightness is not changed, and indication of the property control units 65 and 71 and the color charts 82 and 84 for chroma and hue angle are changed in the aforementioned manner.

As mentioned, every time when the user operates one of the property control units 65, 68 and 71, the allowed correction ranges of the residual properties are repeatedly determined (Step S6), and indication of the property control units are changed (Step S7).

After the user specifies correction strength of the respective properties for a desired color, the user presses down the confirm button 75.

If the input detecting unit 32 detects this user operation (Step S8), then the color adjustment performing unit 34 identifies currently specified correction strength of the respective properties, and performs color correction with the correction strength of the respective properties (Step S9). In this color correction, the whole area of the image 61 may be corrected with the correction strength of the respective properties or only the objective color in the image 61 may be corrected with the correction strength of the respective properties.

In the aforementioned embodiment, if the correction strength specified by one of the property control units 65, 68 and 71 is changed according to the user operation for chroma, brightness or hue angle, then the allowed correction range determining unit 33 determines and changes the allowed correction ranges of residual properties using the predetermined color difference formula to which the changed correction strength of one property among chroma, brightness and hue angle has been applied, and the display control unit changes the selectable ranges of the property control units of the residual properties to the changed allowed correction ranges, and changes indication of the property control units of the residual properties.

Therefore, every time when a user independently adjusts correction strength of chroma, brightness and hue, selectable ranges of the property control units of residual properties are dynamically changed in real time on the basis of an uppermost value of the color difference formula. Consequently, within a range limited by a color difference value (i.e. this uppermost value), broad allowed correction ranges are adequately set for chroma, brightness and hue.

The description has been presented for purposes of illustration and description, and is not intended to be exhaustive or limited.

For example, in the aforementioned embodiment, level values (i.e. numerical values) are used in the property control units 65, 68 and 71. Alternatively, words that indicate levels may be used such as "large", "moderate" and "small".

It should be understood that various changes and modifications to the embodiments described herein will be apparent to those skilled in the art. Such changes and modifications may be made without departing from the spirit and scope of the present subject matter and without diminishing its intended advantages. It is therefore intended that such changes and modifications be covered by the appended claims.

What is claimed is:

1. An image processing apparatus, comprising:
   a display control unit configured to display a color adjustment screen of an image on a predetermined display device;
   an input detecting unit configured to detect a user operation to the color adjustment screen with a predetermined input device; and
   an allowed correction range determining unit configured to determine allowed ranges of correction strength for chroma, brightness and hue angle to correct a color in the image;
   wherein the input detecting unit is further configured to detect a value specified by the user operation as an uppermost value of a predetermined color difference formula for colors before and after correction;
   the allowed correction range determining unit is further configured to determine, as the allowed ranges, ranges of chroma, brightness and hue angle in which a value of the predetermined color difference formula for colors before and after correction at the correction strength is either equal to or less than the uppermost value;
   the display control unit is further configured to display indication of property control units in the color adjustment screen, and the property control units are capable of specifying the correction strength independently for chroma, brightness and hue angle in selectable ranges in accordance with the user operation;
   the allowed ranges are set to the selectable ranges of the property control units for chroma, brightness and hue angle; and
   the allowed correction range determining unit is further configured to, if the correction strength specified by one of the property control units is changed according to the user operation for chroma, brightness or hue angle, determine and change the allowed ranges of residual properties using the predetermined color difference formula to which the changed correction strength of one property among chroma, brightness and hue angle has been applied, and the display control unit is further configured to change the selectable ranges of the property control units of the residual properties to the changed allowed ranges and change indication of the property control units of the residual properties.

2. The image processing apparatus according to claim 1 wherein:
the display control unit is further configured to display the image on the display device;
the input detecting unit is further configured to detect a color specified by the user operation in the image as an objective color; and
the allowed correction range determining unit is further configured to determine, as the allowed ranges, ranges of chroma, brightness and hue angle in which a value of the predetermined color difference formula for (a) the objective color and (b) a color obtained by correcting the objective color with the correction strength is either equal to or less than the uppermost value.

3. The image processing apparatus according to claim 2 wherein the display control unit is further configured to display color charts along the property control units and change the color charts in accordance with change of the selectable ranges, and the color charts indicate color distributions obtained by correcting the objective color along the selectable ranges of the property control units.

4. The image processing apparatus according to claim 1 wherein:
the display control unit is further configured to display a color difference uppermost value control unit in the color adjustment screen, and the color difference uppermost value control unit is capable of specifying the uppermost value of the predetermined color difference formula in a selectable range in accordance with the user operation; and
the allowed correction range determining unit is further configured to, if the uppermost value specified by the color difference uppermost value control unit is changed according to the user operation, determine and change the allowed ranges for chroma, brightness and hue angle, and the display control unit is further configured to set the changed allowed ranges to the selectable ranges of the property control units and change indication of the property control units.

5. The image processing apparatus according to claim 4 wherein:
the display control unit is further configured to display an uppermost value enlarging control unit to enlarge the selectable range of the color difference uppermost value control unit; and
the display control unit is further configured to enlarge the selectable range of the color difference uppermost value control unit in accordance with the user operation to the uppermost value enlarging control unit and change indication of the color difference uppermost value control unit.

6. The image processing apparatus according to claim 1 wherein the predetermined color difference formula is CIEDE2000 color difference formula.

7. The image processing apparatus according to claim 1 further comprising a background color identifying unit configured to identify a background color in the image;
wherein the predetermined color difference formula is a formula that derives a color difference from a chroma difference, a brightness difference and a hue angle difference with a color value of the background color as a parameter.

8. The image processing apparatus according to claim 4 further comprising a background color identifying unit configured to identify a background color in the image;
wherein the predetermined color difference formula is a formula that derives a color difference from a chroma difference, a brightness difference and a hue angle difference with a color value of the background color as a parameter.

9. The image processing apparatus according to claim 1 wherein:
the display control unit is further configured to display the image on the display device; and
the display control unit is further configured to, if the correction strength specified by one of the property control units is changed according to the user operation for chroma, brightness or hue angle, change the displayed image to the image corrected on the basis of (a) the changed correction strength for one property of which the correction strength is changed and (b) the current correction strength for residual properties among chroma, brightness and hue angle.

10. An image forming apparatus, comprising an image processing apparatus;
wherein the image processing apparatus comprises:
a display control unit configured to display a color adjustment screen of an image on a predetermined display device;
an input detecting unit configured to detect a user operation to the color adjustment screen with a predetermined input device; and
an allowed correction range determining unit configured to determine allowed ranges of correction strength for chroma, brightness and hue angle to correct a color in the image;
wherein the input detecting unit is further configured to detect a value specified by the user operation as an uppermost value of a predetermined color difference formula for colors before and after correction;
the allowed correction range determining unit is further configured to determine, as the allowed ranges, ranges of chroma, brightness and hue angle in which a value of the predetermined color difference formula for colors before and after correction at the correction strength is either equal to or less than the uppermost value;
the display control unit is further configured to display indication of property control units in the color adjustment screen, and the property control units are capable of specifying the correction strength independently for chroma, brightness and hue angle in selectable ranges in accordance with the user operation;
the allowed ranges are set to the selectable ranges of the property control units for chroma, brightness and hue angle; and
the allowed correction range determining unit is further configured to, if the correction strength specified by one of the property control units is changed according to the user operation for chroma, brightness or hue angle, determine and change the allowed ranges of residual properties using the predetermined color difference formula to which the changed correction strength of one property among chroma, brightness and hue angle has been applied, and the display control unit is further configured to change the selectable ranges of the property control units of the residual properties to the changed allowed ranges and change indication of the property control units of the residual properties.

* * * * *